(No Model.)

T. H. WINDLE.
ATTACHING TOOLS TO HANDLES.

No. 568,652. Patented Sept. 29, 1896.

Witnesses:
Charles DeCou
Frank E. Bechtold

Inventor:
Thomas H. Windle
by his Attorneys
Howson & Howson

UNITED STATES PATENT OFFICE.

THOMAS H. WINDLE, OF COATESVILLE, PENNSYLVANIA.

ATTACHING TOOLS TO HANDLES.

SPECIFICATION forming part of Letters Patent No. 568,652, dated September 29, 1896.

Application filed February 18, 1896. Serial No. 579,786. (No model.)

*To all whom it may concern:*

Be it known that I, THOMAS H. WINDLE, a citizen of the United States, and a resident of Coatesville, Chester county, Pennsylvania, have invented certain Improvements in Attaching Tools to Handles, of which the following is a specification.

The object of my invention is to provide a means of fastening tools to handles which will insure the secure retention of the tool when applied to the handle, but will permit of the ready release and removal of the same when it is so desired, and this object I attain in the manner hereinafter set forth, reference being had to the acccompanying drawings, in which—

Figure 1:
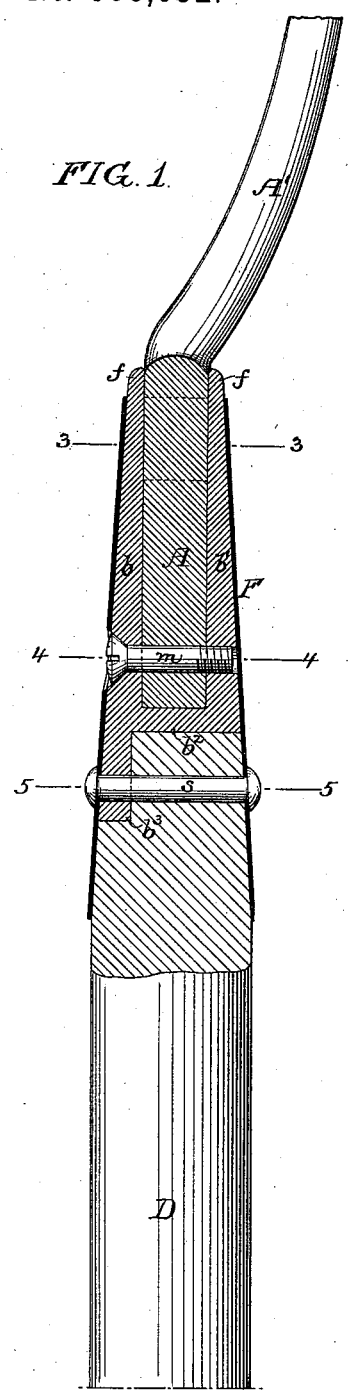
Figure 3:
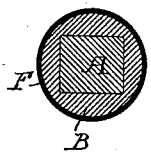
Figure 4:
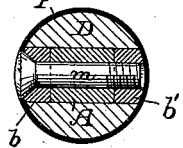
Figure 5:
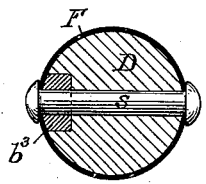
Figure 2:
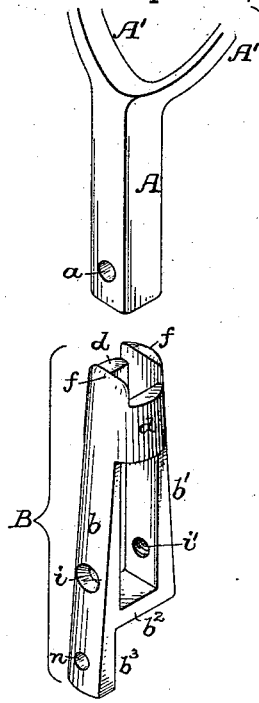
Figure 2:
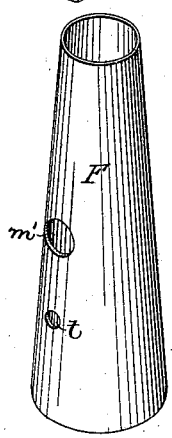
Figure 2:
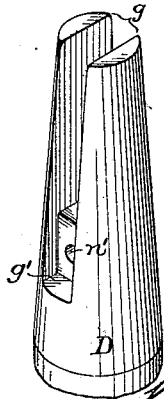

Figure 1 is a longitudinal section of part of a tool-handle with securing device constructed in accordance with my invention. Fig. 2 is a perspective view on a somewhat smaller scale than Fig. 1 and showing the parts detached from each other; and Figs. 3, 4, and 5 are transverse sections, respectively, on the lines 3 3, 4 4, and 5 5, Fig. 1.

I may state in the outset that my invention is applicable to handles for any of that class of tools which have a projecting stem or tang, such as forks, hoes, cleavers, and the like, a fork similar to an ordinary pitchfork having been selected as an example for the purpose of illustrating my invention.

A represents the tang, and A' parts of the tines of the fork, the tang having formed through it, near its inner end, a transverse opening $a$. Fitting snugly to the tang A of the fork is a socket B, composed of opposite legs $b\ b'$, connected at the outer ends by side webs $d\ d$ and at the inner ends by a cross-web $b^2$, one of these side legs of the socket projecting beyond the inner web $b^2$, as shown at $b^3$. Both of the said legs of the socket project beyond the outer connecting-webs $d$, so as to form lips or cheeks $f$, which flank the neck of the fork, as shown in Fig. 1, the tines A' having their bearing upon the outer ends of the webs $d\ d'$.

The wooden handle D of the tool has a central recess $g$ for the reception of the socket and a side recess $g'$ for the reception of the projecting leg $b^3$ of the latter, and a ferrule F surrounds the end of the handle and the socket, as shown in Fig. 1.

In the opposite legs of the socket are formed openings $i\ i'$, the latter opening being threaded for the reception of the threaded end of a screw-bolt $m$, which passes through the opening $i$ and through the opening $a$ of the tang of the fork and is screwed into said opening $i'$, the ferrule having an opening $m'$, so as to permit of the insertion or withdrawal of said screw-bolt $m$.

In the projecting portion $b^3$ of the side leg $b$ of the socket is formed an opening $n$, which, when the socket is in its proper position on the handle, registers with an opening $n'$, formed through said handle, as shown in Fig. 2, so as to provide for the insertion of a pin or rivet $s$, which passes through the openings $n\ n'$ and also through openings $t$, formed in the ferrule.

It will be observed that the socket B is firmly retained in position on the handle by means of the tapered ferrule F and pin or rivet $s$, so that it need not be disturbed when it becomes necessary to remove or replace the tool, the removal of the screw-bolt $m$ serving to release the tang of the tool, so as to permit of its withdrawal, and reapplication of the screw-bolt serving to again secure the tang of the tool firmly to the socket after replacement.

It will be evident that the projecting portion $b^3$ of the socket may be extended so as to provide for the use of two or more rivets, if desired, and both of the side legs of the socket may be extended in some cases, the purpose of extending only one of them being to lessen the cutting away of the wooden handle, which would otherwise be necessary.

The presence of the web $b^2$ at the inner ends of the legs $b\ b'$ of the socket effectually prevents any such drawing together of said legs $b\ b'$ by the screw-bolt $m$ or rivet $s$ as would distort the same and prevent them from having their proper bearing upon the ferrule F or cause them to clamp the tang A, while the projecting cheek-pieces or lips $f$ of the socket, flanking the neck of the fork, serve to properly support the same at the point where such support is most required and aid in preventing the loosening or twisting of the tang in the socket. The device, moreover, is of a simple character and can be readily applied to tools now in use by simply slotting the end of the handle for the reception of the socket and forming the necessary openings in said handle and in the ferrule F, the socket serving to hold the fork or other tool in its proper relation to the handle under all circumstances and thus preventing the crooked insertion of the tang, which is likely to take place when the same is driven directly into the wooden handle.

Having thus described my invention, I claim and desire to secure by Letters Patent—

1. The combination of a tool having a projecting stem or tang, a socket which receives said projecting stem or tang, a transverse bolt for securing the socket and tang together, a handle for the reception of the socket, and means for securing said socket to the handle, substantially as specified.

2. The combination of the tool having a projecting stem or tang, a socket receiving said tang and consisting of opposite legs lying in contact with the sides of the tang and connected together at the outer ends by side webs, a transverse bolt whereby the tang is secured to said socket, a handle recessed for the reception of the socket, and means for securing the socket to said handle, substantially as specified.

3. The combination of the tool having a projecting stem or tang, a socket adapted to engage said tang and consisting of opposite legs having at the outer ends connecting side webs and projecting cheek-pieces or lips, a transverse bolt for securing the tang to said socket, a handle recessed for the reception of the socket, and means for securing the socket to said handle, substantially as specified.

4. The combination of the tool having a projecting stem or tang, a socket adapted to engage said tang and consisting of opposite side legs having at the inner end a connecting and bracing web, a transverse bolt whereby the tang is secured to said socket, a handle recessed for the reception of the socket, and means for securing the socket to said handle, substantially as specified.

5. The combination of the tool having a projecting stem or tang, a socket adapted to engage said tang and consisting of opposite side legs with connecting and bracing web beyond which a side leg extends, a transverse bolt for securing the tang of the tool to the socket, a handle slotted for the reception of the socket, and a pin or rivet passing through said handle and through the projecting side leg of the socket, substantially as specified.

6. The combination of the tool having a projecting stem or tang, a socket which receives said projecting tang, a transverse bolt whereby the tang is secured to the socket, a handle recessed for the reception of the socket, a ferrule inclosing said socket and that portion of the handle which receives the same, and means for securing the socket and ferrule to the handle, substantially as specified.

In testimony whereof I have signed my name to this specification in the presence of two subscribing witnesses.

THOMAS H. WINDLE.

Witnesses:
DAVID H. WEAVER,
G. E. WEAVER.